US009235861B2

(12) United States Patent
Esplin et al.

(10) Patent No.: US 9,235,861 B2
(45) Date of Patent: *Jan. 12, 2016

(54) SYSTEM AND METHOD FOR MANAGING WIRELESS POINT-OF-SALE TRANSACTIONS

(71) Applicant: Apple Inc., Cupertino, CA (US)

(72) Inventors: David Benjamin Esplin, San Marcos, CA (US); Jill Andrews Esplin, San Marcos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,183

(22) Filed: Oct. 25, 2013

(65) Prior Publication Data
US 2015/0221042 A1 Aug. 6, 2015

Related U.S. Application Data

(63) Continuation of application No. 12/983,870, filed on Jan. 3, 2011, now Pat. No. 8,616,448, which is a continuation of application No. 12/050,170, filed on Mar. 18, 2008, now Pat. No. 7,861,930, which is a continuation of application No. 11/402,243, filed on Apr. 11, 2006, now Pat. No. 7,353,991, which is a continuation-in-part of application No. 11/358,353, filed on Feb. 21, 2006, now Pat. No. 7,364,071.

(51) Int. Cl.
G06K 15/00 (2006.01)
G06Q 40/00 (2012.01)
G06Q 20/10 (2012.01)
G06Q 20/20 (2012.01)
G06Q 20/32 (2012.01)
G06Q 20/36 (2012.01)
G06Q 20/38 (2012.01)
G06Q 20/40 (2012.01)

(52) U.S. Cl.
CPC .............. *G06Q 40/12* (2013.12); *G06Q 20/10* (2013.01); *G06Q 20/20* (2013.01); *G06Q 20/202* (2013.01); *G06Q 20/204* (2013.01); *G06Q 20/32* (2013.01); *G06Q 20/327* (2013.01); *G06Q 20/3221* (2013.01); *G06Q 20/3229* (2013.01); *G06Q 20/3674* (2013.01); *G06Q 20/382* (2013.01); *G06Q 20/40* (2013.01)

(58) Field of Classification Search
USPC ................... 235/383, 380, 472.01, 381, 379, 235/472.02, 487; 705/64–67, 16, 39
See application file for complete search history.

(56) References Cited

U.S. PATENT DOCUMENTS 6,149,055 A 11/2000 Gatto
7,185,805 B1 3/2007 McShirley (Continued)

*Primary Examiner* — Edwyn Labaze
(74) *Attorney, Agent, or Firm* — Novak Druce Connolly Bove + Quigg LLP

(57) ABSTRACT

A system that enables a wireless point-of-sale transaction. In one embodiment the system comprises an account module, an account selection module, a display, an input interface, and a wireless transmitter. The account module stores account information corresponding to a plurality of payment accounts. The account selection module selects a payment account from the plurality of payment accounts as a default payment account for a wireless point-of-sale transaction based on one or more predetermined criteria. The display displays the default payment account to a user. The input interface enables the user to accept the default payment account by the account selection module. The wireless transmitter that wirelessly transmits payment information to a point-of-sale device, wherein the payment information comprises account information associated with the default account when the default payment account is accepted via the input interface.

15 Claims, 19 Drawing Sheets

(56) References Cited

U.S. PATENT DOCUMENTS

| | | |
|---|---|---|
| 7,254,548 B1 | 8/2007 | Tannenbaum |
| 2002/0046185 A1 | 4/2002 | Villart et al. |
| 2002/0111907 A1* | 8/2002 | Ling .............................. 705/41 |
| 2002/0116329 A1 | 8/2002 | Serbetcioglu et al. |
| 2002/0143655 A1 | 10/2002 | Elston et al. |
| 2002/0184222 A1 | 12/2002 | Kohut et al. |
| 2003/0055785 A1 | 3/2003 | Lahiri |
| 2004/0024700 A1 | 2/2004 | Petigny |
| 2004/0117302 A1 | 6/2004 | Weichert et al. |
| 2004/0248548 A1 | 12/2004 | Niwa et al. |
| 2004/0267618 A1 | 12/2004 | Judicibus et al. |
| 2005/0149437 A1 | 7/2005 | Zellner et al. |
| 2005/0187873 A1 | 8/2005 | Labrou et al. |
| 2006/0144932 A1 | 7/2006 | Bendeck et al. |
| 2006/0161474 A1 | 7/2006 | Diamond et al. |
| 2006/0175403 A1* | 8/2006 | Fossen McConnell et al. ........................ 235/385 |
| 2007/0215687 A1 | 9/2007 | Waltman |
| 2011/0238501 A1 | 9/2011 | Almeida |
| 2013/0191213 A1* | 7/2013 | Beck .................. G06Q 30/0267 705/14.53 |
| 2013/0211890 A1* | 8/2013 | Heitmueller ....... G06Q 30/0207 705/14.13 |

* cited by examiner

SELECT CREDIT ACCOUNT FOR THIS PAYMENT
① AMEX    ...1206
② VISA    ...7402
③ MASTER  ...8901
④ OTHER
⑤ OTHER PAYMENT METHOD

FIG. 10

USE THIS CREDIT ACCOUNT AS A DEFAULT FOR ALL TRANSACTIONS
① AT THIS LOCATION
② AT THIS RETAILER
③ FOR TRANSACTIONS @ OR ABOVE THIS $ THRESHOLD
④ FOR TRANSACTIONS @ OR BELOW THIS $ THRESHOLD
⑤ AT RETAILERS OF THIS TYPE
⑥ AS LONG AS THE BALANCE IS @ OR ABOVE $ THRESHOLD
⑦ AS LONG AS THE BALANCE IS @ OR BELOW $ THRESHOLD
⑧ BETWEEN TIME THRESHOLD TO TIME THRESHOLD
⑨ A COMBINATION OF THE ABOVE
⑩ ALWAYS
⑪ NEVER
⑩ DO NOT CHANGE CURRENT DEFAULT RANK

FIG. 11

TRANSACTION RECORD

ITEM 1 ----------------$1.00
ITEM 2 ----------------$5.00
ITEM 3 ----------------$6.00
TAX -------------------$20.00
                       $32.00

ACME | DATE

123 CIRCLE DRIVE
STERLING, VA 20165

AMEX    ...1206

STORE RECORD?
(1) YES
(2) NO

ITEM CLASSIFICATION

ITEM 1 ---------------- FOOD
ITEM 2 ---------------- CLOTHING
ITEM 3 ---------------- ENTERTAINMENT

ACCEPT CLASSIFICATION ?
(1) YES
(2) NO
(3) MARK FOR LATER REVIEW

FIG. 16

SELECT TRANSACTION CLASSIFICATION

62

① FOOD

② CLOTHING

③ ENTERTAINMENT

④ TRAVEL

⑤ WORK EXPENSE

⑥ OTHER

TRANSACTION CLASSIFICATION

62

[ FOOD ]

ACCEPT?

① YES

② NO

③ MARK FOR LATER REVIEW

FIG. 13            — 22

SET THIS CLASSIFICATION FOR ALL TRANSACTIONS:

64

(1) AT THIS LOCATION (2) AT THIS RETAILER (3) OTHER

FIG. 15  22

SPENDING HISTORY BY <u>TIME PERIOD</u>

| DATE | AMOUNT | ACCOUNT | | |
|---|---|---|---|---|
| 1/11/2006 | 10.11 | AMEX | ...1206 | VIEW DETAILS ① |
| 1/12/2006 | 250.12 | MASTER | ...8901 | VIEW DETAILS ② |
| 1/14/2006 | 25.18 | CHECKING | ...7871 | VIEW DETAILS ③ |
| . | . | . | | |
| . | . | . | | |
| . | . | . | | |
| TOTAL | 1,025.76 | | | |

FIG. 19  —22

SPENDING HISTORY BY <u>CLASSIFICATION</u>

| DATE | AMOUNT | ACCOUNT | | |
|---|---|---|---|---|
| DATE1 | AMOUNT1 | ACCOUNT1 | VIEW DETAILS | ① |
| DATE2 | AMOUNT2 | ACCOUNT2 | DETAILS | ② |
| DATE3 | AMOUNT3 | ACCOUNT3 | DETAILS | ③ |
| . | . | . | | |
| . | . | . | | |
| . | . | . | | |
| AMOUNT TOTAL | | | | |

FIG. 20  —22

```
              TRANSACTION RECORD
   RETAILER------------ RETAILER TRANSACTION INFO.

ITEM   RETAILER ITEM INFO.      CLASS         PRICE
  ITEM 1  ~~~~~~~~~~~~~~          FOOD          10.00
  ITEM 2  ~~~~~~~~~~~~~~          FOOD          12.00
  ITEM 3  ~~~~~~~~~~~~~~       ENTERTAINMENT     5.00
                                     TOTAL      27.00
  70
      (1) TRANSMIT (2) MODIFY CLASSIFICATION (3) OTHER
```

FIG. 21

SET SPENDING THRESHOLD

① PER TRANSACTION

② PER TIME PERIOD

FIG. 22  — 22

SET SPENDING THRESHOLD BY

① CLASSIFICATION

② PAYMENT METHOD TYPE

③ PAYMENT ACCOUNT

④ LOCATION

⑤ RETAILER

⑥ OTHER

⑦ COMBINATION

FIG. 23  — 22

ACTION TO TAKE WHEN THRESHOLD REACHED

① VISUAL/AUDIBLE ALERT

② 3RD PARTY ALERTS

③ RESTRICT PAYMENT OPTIONS

④ OTHER

FIG. 24

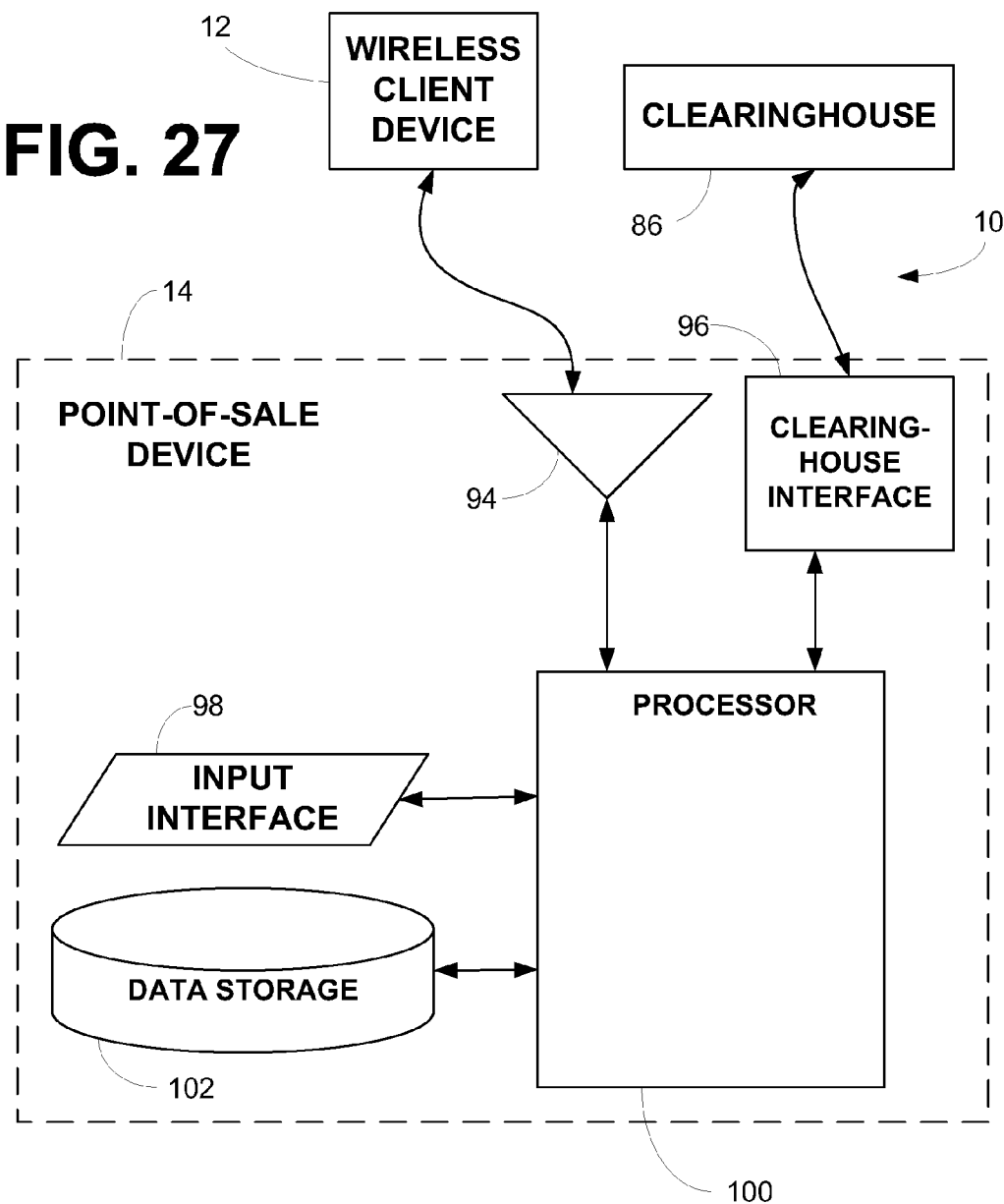

SYSTEM AND METHOD FOR MANAGING WIRELESS POINT-OF-SALE TRANSACTIONS

RELATED APPLICATIONS

This application is a continuation of U.S. patent application Ser. No. 12/050,170, filed Mar. 18, 2008, and entitled "System and Method For Managing Wireless Point-of-Sale Transactions; which is a continuation of U.S. patent application Ser. No. 11/402,243, filed Apr. 11, 2006, and entitled "System and Method for Managing Wireless Point-of-Sale Transactions;" which is a continuation-in-part of U.S. patent application Ser. No. 11/358,353, filed Feb. 21, 2006, and entitled "System and Method for Managing Wireless Point-of-Sale Transactions." These applications are incorporated by reference herein in their entirety.

FIELD OF THE INVENTION

The invention relates to the enablement and management of wireless point-of-sale payments by a user physically present at brick-and-mortar retailers.

BACKGROUND OF THE INVENTION

The use of wireless technologies, such as "smart card" technology to make wireless payments at brick-and-mortar retail locations is generally known. However, typically payment cards that use these technologies are only a wireless substitute for cards implementing older account identification methods, such as magnetic strips, or carbon copying. Conventional smart cards are passive components that do not enable active management of multiple accounts by a user. These and other drawbacks associated with known wireless point-of-sale payment systems are known.

SUMMARY

One aspect of the invention relates to a method of conducting a wireless point-of-sale transaction between a brick-and-mortar merchant and a customer physically present at a facility associated with the brick-and-mortar merchant. In one embodiment, the method comprises wirelessly transmitting a transaction request, the transaction request requesting approval for the wireless point-of-sale transaction from the customer and comprising a transaction amount; receiving a wireless transmission of a transaction approval indicating that the customer has approved the wireless point-of-sale transaction, wherein the transaction approval comprises payment information, the payment information comprising (i) customer clearinghouse identification information that identifies a clearinghouse account associated with the customer and (ii) payment account identification information that identifies a payment account associated with the clearinghouse account associated with the customer, and wherein the payment account has been selected by the customer; transmitting a transfer request that funds be transferred from the clearinghouse account associated with the customer to a clearinghouse account associated with the merchant, the transfer request comprising the transaction amount, at least a portion of the payment information, and merchant clearinghouse identification information that identifies the clearinghouse account associated with the merchant; receiving a transfer confirmation of the requested transfer of funds, the transfer confirmation comprising confirmation information that confirms that a transfer of funds from the payment account identified by the payment account identification information to the clearinghouse account associated with the merchant has been secured, wherein transfer of funds corresponds to the transaction amount.

Another aspect of the invention relates to a point-of-sale device that enables a wireless point-of-sale transaction between a brick-and-mortar merchant and a customer physically present at a facility associated with the brick-and-mortar merchant. In one embodiment, the device comprises an input interface, a transmitter/receiver module, and a clearinghouse interface. The input interface enables purchase information to be input to the point-of-sale device, wherein the purchase information comprises a transaction amount that is the cost of one or more goods and/or services being transacted for by the customer. The transmitter/receiver module is operable to wirelessly transmit a transaction request and receive a wireless transmission of a transaction approval, wherein the transaction request requests approval for the wireless point-of-sale transaction from the customer and comprises the transaction amount, and wherein the transaction approval indicates that the customer has approved the wireless point-of-sale transaction and comprises payment information, the payment information comprising (i) customer clearinghouse identification information that identifies a clearinghouse account associated with the customer and (ii) payment account identification information that identifies a payment account associated with the clearinghouse account associated with the customer. The clearinghouse interface is operable to transmit a transfer request and receive a transfer confirmation, wherein the transfer request requests that funds be transferred from the clearinghouse account associated with the customer to a clearinghouse account associated with the merchant and comprises the transaction amount, at least a portion of the payment information, and merchant clearinghouse identification information that identifies the clearinghouse account associated with the merchant, and wherein the transfer confirmation comprises confirmation information that confirms that a transfer of funds from the payment account identified by the payment account identification information to the clearinghouse account associated with the merchant has been secured.

Another aspect of the invention relates to a method of enabling a point-of-sale transaction between a brick-and-mortar merchant and a customer physically present at a facility associated with the brick-and-mortar merchant. In one embodiment, the method is executed substantially by a clearinghouse and comprises maintaining a plurality of clearinghouse accounts wherein each clearinghouse account is associated with a user, the plurality of clearinghouse accounts comprises a clearinghouse account associated with the customer and a clearinghouse account associated with the merchant; linking a plurality of payment accounts to the clearinghouse account associated with the customer such that the clearinghouse is authorized to transfer funds out of the one or more payment accounts and into the clearinghouse account associated with the customer upon receiving approval for such a transfer from the customer; receiving a transfer request from the merchant that requests that funds be transferred from the clearinghouse account associated with the customer to the clearinghouse account associated with the merchant and comprises (i) a transaction amount, (ii) customer clearinghouse identification information that identifies the clearinghouse account associated with the customer, (iii) payment information that identifies a payment account linked to the clearinghouse associated with the customer, and (iv) merchant clearinghouse identification information that identifies a clearinghouse account associated with the merchant, wherein the transfer request provides proof of authorization that indicates to the clearinghouse that the customer has authorized the transfer of funds from the clearinghouse account associated with the customer to the clearinghouse account associated with the merchant; securing funds from the payment account identified by the payment information, wherein the secured funds correspond to the transaction amount; and transmitting a transfer confirmation to the merchant, the transfer confirmation comprising confirmation information that confirms that the funds corresponding to the transaction amount have been secured from the payment account identified by the payment account identification information.

BRIEF DESCRIPTION OF THE DRAWINGS

FIG. 10 illustrates a user interface, in accordance with one or more embodiments of the invention.

FIG. 11 illustrates a user interface, in accordance with one or more embodiments of the invention.

FIG. 12 illustrates a user interface, in accordance with one or more embodiments of the invention.

FIG. 13 illustrates a user interface, in accordance with one or more embodiments of the invention.

FIG. 14 illustrates a user interface, in accordance with one or more embodiments of the invention.

FIG. 15 illustrates a user interface, in accordance with one or more embodiments of the invention.

FIG. 16 illustrates a user interface, in accordance with one or more embodiments of the invention.

FIG. 19 illustrates a user interface, in accordance with one or more embodiments of the invention.

FIG. 20 illustrates a user interface, in accordance with one or more embodiments of the invention.

FIG. 21 illustrates a user interface, in accordance with one or more embodiments of the invention.

FIG. 22 illustrates a user interface, in accordance with one or more embodiments of the invention.

FIG. 23 illustrates a user interface, in accordance with one or more embodiments of the invention.

FIG. 24 illustrates a user interface, in accordance with one or more embodiments of the invention.

FIG. 27 illustrates a system that enables the execution and management of wireless point-of-sale transactions, according to one or more embodiments of the invention.

DETAILED DESCRIPTION

Figure 1:
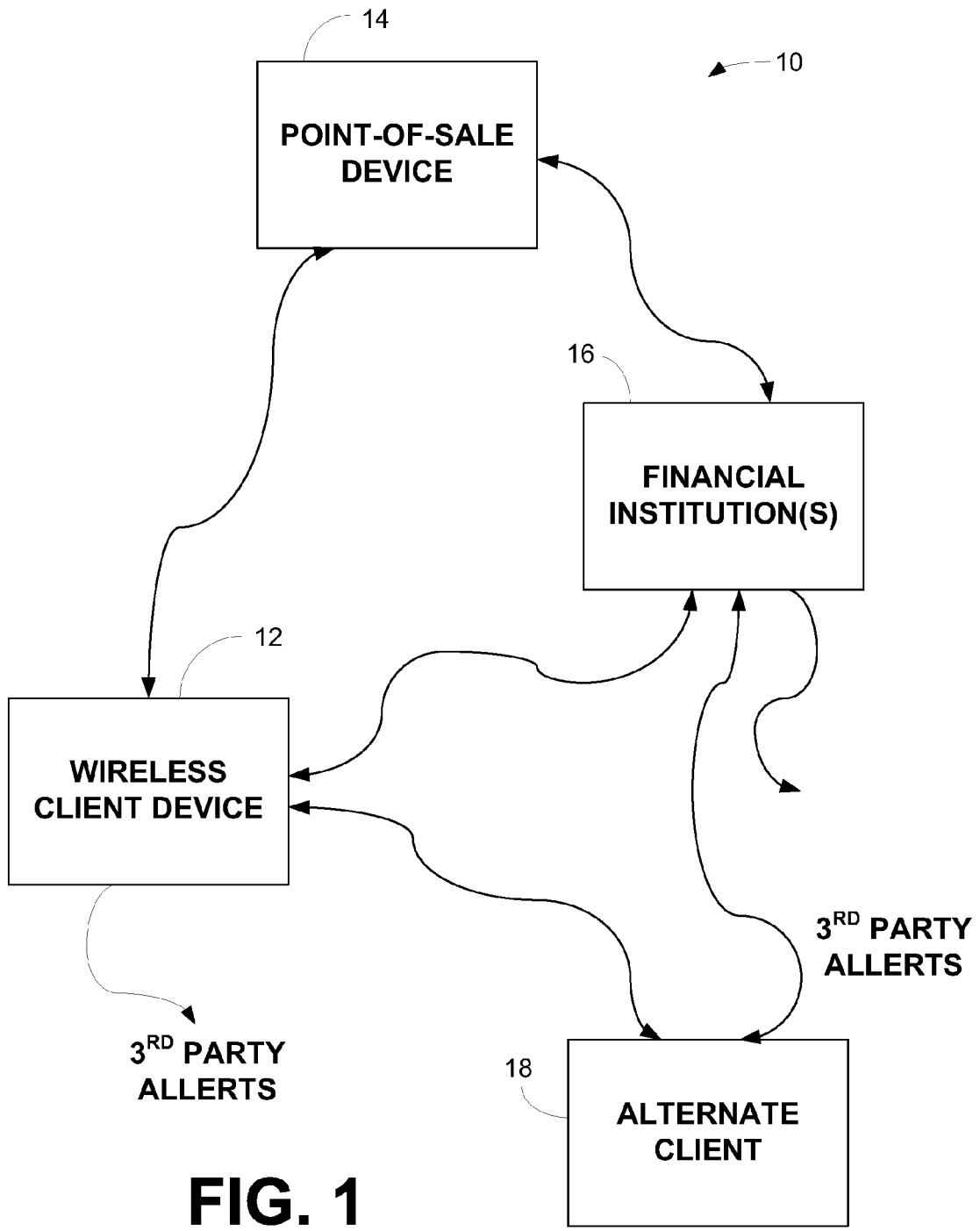
FIG. 1 illustrates a system that enables the execution and management of wireless point-of-sale transactions, according to one or more embodiments of the invention.

FIG. 1 illustrates a system 10 that enables the execution and management of wireless point-of-sale transactions, according to one or more embodiments of the invention. System 10 may include a wireless client device 12, a point-of-sale device 14, and one or more financial institutions 16. System 10 may enable a user to execute a point-of-sale transaction by initiating a wireless transmission of transaction information from wireless client device 12 to point-of-sale device 14.

In one implementation of the invention, wireless client device 12 may include a "handheld" electronic client device capable of storing and managing account information associated with one or more payment accounts, and wirelessly transmitting and/or receiving information. For example, wireless client device 12 may comprise a Personal Digital Assistant, a handheld computer, a radio telephone, a satellite telephone, a pager, a personal music player, or other client devices.

In one implementation of the invention, point-of-sale device 14 may include a point-of-sale device located at a brick-and-mortar retailer, and may enable individuals to purchase goods and/or services from the retailer. For instance, point-of-sale device 14 may comprise a cashier station within a retail store (e.g., a supermarket checkout, a department store register, an electronics store register, etc.), an automated point-of-sale station associated with the retailer (e.g., a gasoline station "pay at the pump" device, an automated supermarket checkout, etc.), or other point-of-sale devices.

Financial institutions 16 may include one or more institutions with which the user maintains payment accounts. For example, financial institutions 16 may comprise a lender, a bank, a credit card company, a retailer (e.g., a retailer that extends lines of credit to customers), a financing company, and/or other financial institutions. A payment account may include any account from which a retailer may receive payment (or make payment to) based on the user's interaction with a point-of-sale device (e.g., point-of-sale device 14). Some non-limiting examples of a payment account may include a checking account, a savings account, a money market account, a pre-paid account, a credit account, a credit card account, and/or other payment accounts.

According to one implementation of the invention, the user may initiate a point-of-sale transaction by specifying one or more goods and/or services for purchase from the retailer associated with point-of-sale device 14. The goods and/or services specified by the user may be conveyed to point-of-sale device 14 (e.g. during "check out"), and a total cost to the user for the transaction may be determined by point-of-sale device 14. Wireless client device 12 may enable the user to select a payment account from which funds are transferred as part of a wireless point-of-sale transaction, and may enable payment information to be transmitted wirelessly to point-of-sale device 14 as part of the execution of the wireless transaction. The payment information may comprise account information associated with the selected payment account. For instance, the payment information may be wirelessly transmitted from wireless client device 12 to point-of-sale device 14. The wireless transmission of payment information from wireless client device 12 to point-of-sale device 14 may comprise a transmission via virtually any wireless medium and/or protocol presently know or available in the future. For instance, the wireless medium and/or protocol may comprise Bluetooth, Bluetooth 2.1, infrared transmission, radio frequency transmission (e.g., direct transmission or transmission via a base station), and/or other wireless media and/or protocols.

Upon receipt of the payment information, point-of-sale device 14 may generate a request for payment from a financial institution associated with the payment account selected by the user on wireless client device 12. In one implementation, the payment request may be transmitted to the financial institution, which may respond with a payment response that may be transmitted back to point-of-sale device 14. The payment response may comprise a promise to make the payment and/or a payment confirmation.

After receiving the payment response, point-of-sale device 14 may generate a transaction record to be provided to the user along with the goods and/or service purchased. In some instances, a transaction record may also be provided to the financial institution that transmitted the payment response. One or both of the transaction record provided to the user and/or the financial institution may include a paper record of the transaction, an electronic record of the transaction, or both. It should be appreciated that the forms of the two transaction records need not be the same. For example, in one implementation, the user may be provided with a paper record and the financial institution may be provided with an electronic record, or vice versa. Further, the information and level of detail of the two transaction records may also be different. In the instances in which the transaction record provided to the user comprises an electronic record of the transaction, the electronic record may be transmitted wirelessly from point-of-sale device 14 to wireless client device 12. The electronic record received by wireless client device 12 may then be processed and/or stored for future access by the user. For instance, the electronic record may be stored locally on wireless client device 12, and/or wireless client device 12 may wirelessly transmit the electronic record to an alternate client 18 for remote storage. In one non-limiting example, the electronic record may be temporarily stored on wireless client device 12 and transmitted at a later time (selected automatically or by the user) to alternate client 18 for more permanent storage. Communication of electronic records, and/or other information, between wireless client device 12 and alternate client 18 may comprise wireless communications implementing any of the electronic media and/or protocols previously mentioned and/or wired communication (e.g., via a docking station or networking port).

Alternate client 18 may comprise an electronic processing device with more processing power and/or storage capacity than wireless client device 12. For example, alternate client device 12 may include a desktop computer, a laptop computer, and/or other client devices.

It should be appreciated that various ones of the depicted operative links between wireless client device 12, point-of-sale device 14, financial institutions 16, and alternate client 18 may not be present in some of the embodiments of the invention, or an operative link shown in FIG. 1 as being enabled for transmitting information in either direction may be implemented in some embodiments as a one-way link. For example, in one embodiment, wireless client device 12 may not receive information from some or all of financial institutions 16 without the information first being relayed to alternate client 18. As another example, in one embodiment, alternate client 18 may not be implemented at all. As yet another example, in one embodiment, information is wirelessly transmitted from wireless client device 12 to point-of-sale device 14, but information may not be transmitted from point-of-sale device 14 to wireless client device 12. Other examples also exist.

Figure 2:
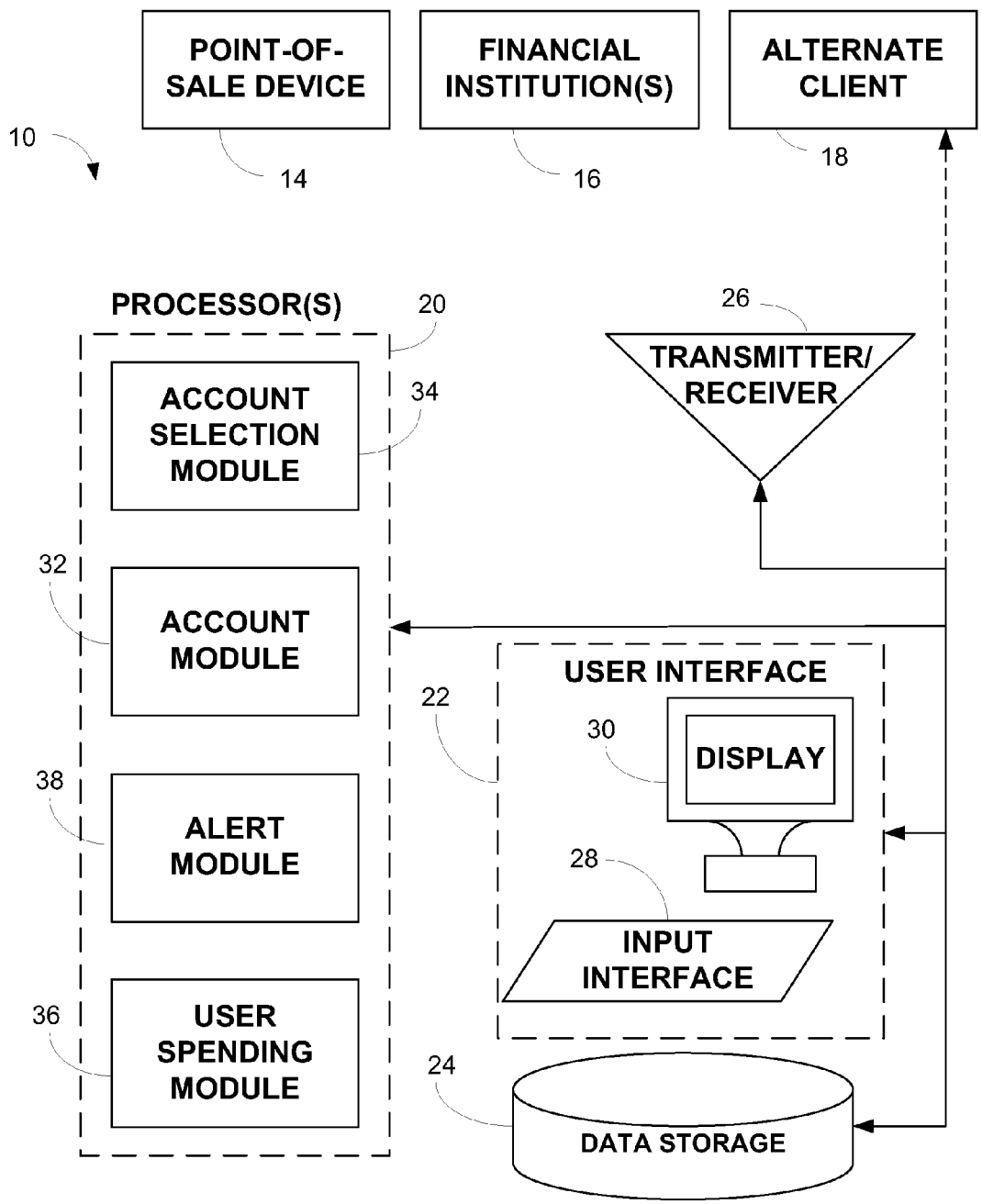
FIG. 2 illustrates a system that enables the execution and management of wireless point-of-sale transactions, according to one or more embodiments of the invention.

FIG. 2 illustrates system 10 according to one or more embodiments of the invention. As shown in FIG. 2, system 10 may include one or more processors 20, a user interface 22, a data storage 24, a wireless transmitter/receiver 26 (e.g., a single component that both transmits and receives, separate components for transmitting and receiving, etc.), and/or other components.

As can be seen in FIG. 2, user interface 22 may comprise an input interface 28 and a display 30. Input interface 28 may comprise one or more devices that enable the user to input information and/or commands to processor 20. For instance, input interface 28 may comprise a keyboard, a keypad, a mouse, a joystick, a button, a knob, a solid-state input device, a lever, a touchpad, a touchscreen, a switch, a trackball, and/or other input devices. Display 30 may visually convey information to the user. For example, display 30 may include a pixilated electronic display such as an LCD display, an OLED display, a micro-mirror device display, other pixilated electronic displays, and/or other displays. In some implementations, user interface 22 may comprise other sensory feedback mechanisms to convey information to the user. As a non-limiting example, user interface 22 may comprise an audible feedback system (e.g., a speaker system, etc.), a sensory feedback system, and/or other sensory feedback systems. In one or more implementations, user interface 22 may comprise at least one input interface and at least one display provided on wireless client device 12.

Data storage 24 may comprise one or more electronic storage media that enable storage of information (e.g., payment account information, transaction information, user-spending information, etc.). The storage media of data storage 24 may comprise any electronic storage medium currently known or available in the future. In some instances, data storage 24 may comprise a single storage medium within a single storage device. In other instances, data storage 24 may comprise one or more storage media within a plurality of separate devices which may or may not be in communication with each other.

Transmitter/receiver 26 may comprise one or more components capable of transmitting and receiving wireless information over a wireless communications link. In some implementations, transmitter/receiver 26 may include a plurality of transmitters and/or receivers that enable wireless communication via a plurality of different wireless communication media and/or protocols. Further, transmitter/receiver may, in practice, include separate transmitters and/or receivers associated with a plurality of devices to enable wireless communication of information to and from processor 20, user interface 22, and/or data storage 24. In some instances, transmitter/receiver 26 may comprise more than one transmitter and/or more than one receiver associated with a single device. This may enable the single device communicate wirelessly via more than one wireless medium and/or protocol.

In one or more implementations of the invention, processor 20 may execute one or more modules comprising an account module 32, an account selection module 34, a user-spending module 36, alert module 38 and/or other modules. Modules 32, 34, 36, and 38 may be implemented as hardware modules, software modules, firmware modules, or as a combination of hardware, software and/or firmware. Modules 32, 34, 36, and 38 may be executed locally to each other (e.g., on the same device), or remotely from each other (e.g., in separate devices interfacing via an operative link). In some embodiments of the invention, the functionality of a single module may be provided within a plurality of sub-modules (not shown) being executed remotely from each other. In one or more embodiments of the invention, processor 20 may comprise a single processor. In some instances, the single processor may be disposed within a single device (e.g., wireless client device). However, such instances are not limiting, and in other instances processor 20 may comprise a plurality of processors that may be located within a single device or within separate devices. In most implementations, processor 20 comprises at least one processing component within wireless client device 12.

Account module 32 may store account information associated with a plurality of payment accounts that the user has access to. Account module 32 may store the account information in data storage 24, and may manage the information, information structure, and/or other aspects of the storage of the account information. Some non-limiting examples of account information may include an account number, a routing number, a card number, an institution associated with an account (e.g., a bank, etc.), an account balance, one or more transaction records, account holder information (e.g., name, social security number, birthday, address, etc.) associated with a holder of a payment account (e.g., the user and/or other holders), security information associated with a payment account (e.g., a password, a personal identification number, biometric information, etc.), and/or other account information. The stored account information may be updated manually and/or automatically. For example, when one of the payment accounts is used to make a payment (or receive a credit) in a wireless point-of-sale transaction, balance information associated with the payment account may be updated to reflect the funds transferred in the wireless point-of-sale transaction.

When a wireless transaction is initiated, account selection module 34 selects a payment account as a default payment account for a wireless point-of-sale transaction based on one or more predetermined criteria. The default payment account may be selected by account selection module 34 from the payment accounts associated with the account information stored by account module 32. As is discussed further below, the one or more predetermined criteria may comprise one or more criteria based on a retailer, a physical location, an account balance, a type (e.g., a classification) of a good and/or service being purchased, a transaction amount, a time, a user preference, user spending information that includes one or more aspects of one or more transaction records of one or more previous wireless point-of-sale transactions, and/or other criteria based on other considerations.

In some instances, display 30 may convey the selection of the default account to the user. Input interface 28 may then enable the user to accept or reject the default payment account selected by account selection module 34. If the user accepts the default payment account, payment information including account information associated with the default payment account may be transmitted wirelessly from wireless client device 12 to facilitate the wireless point-of-sale transaction. In one or more implementations, the selection of the default account by account selection module 34 may include ranking a plurality payment accounts from most likely to be used by the user for that particular transaction to least likely to be used by the user for that particular transaction based on the one or more predetermined criteria. In one implementation, display 30 may display to the user more payment accounts than the payment account ranked most likely to be used. For example, display 30 may display the 5 payment accounts most likely to be used (in a manner representative of their order and/or relative likelihood of usage). In such implementations, as well as in implementations in which only the payment account ranked most likely to be use is displayed, input interface 28 enables the user to reject the default payment account selected by account selection module 34 and manually select a user-preferred payment account from the plurality of accounts stored in account module 32. Additional functionality may also be provided by account spending module 34.

User spending module 36 may track the user's spending based on transaction information received via transmitter/receiver 26. For example, the transaction information may include transaction records, transaction amounts, and/or other transaction information. User spending module 36 may track user spending with respect to a total amount spent over a specified (automatically and/or manually) time period, spending at a specified (automatically and/or manually) retailer or group of retailers, spending at a specified (automatically and/or manually) location or group of locations, spending using a specified (automatically and/or manually) account or group of accounts, spending on a specified (automatically and/or manually) type of good and/or service or group of types of goods and/or services, current balance(s) on one or more specified (automatically and/or manually) accounts, other considerations, and/or a combination of considerations.

In some implementations, input interface 28 enables the user to input one or more spending thresholds that are stored by user spending module 36. User spending module 36 may store the spending thresholds in data storage 24. A spending threshold may include a monetary amount, one or more transaction criteria (e.g., one or more payment accounts, one or more classifications of goods and/or services, one or more retailers, one or more locations, etc.), a payment account criteria (e.g., a balance, etc.), and/or a time period (e.g., a specified interval from a specified start time, a series of periodic intervals, a specified interval from a "trigger", etc.). As an example, a spending threshold may be input by the user that includes a threshold monetary amount, a specified type of good and/or service, and a threshold time period. If the user exceeds the threshold monetary amount during the threshold time period, on goods and/or services of the specified type, the spending threshold has been breached. As another example, a spending threshold may be input by the user including a threshold monetary amount and a specified payment account. If the user exceeds the threshold monetary amount in a single transaction on the specified account, the spending threshold has been breached. It should be appreciated that these examples are not limiting, and that an array of possible spending thresholds is possible based on the types of information presented above that may be used to establish a spending threshold.

User spending module 36 may compare the user's spending with the spending thresholds established by the user. When a spending threshold is breached, a predetermined action may be executed by processor 20. For example, alert module 38 may generate an alert. The alert generated by alert module 38 may be provided to the user and/or to a third party. An alert may include a visual alert, an audible alert, and/or another type of alert provided on wireless client device 12. Alerts provided to the user may enable the user to track her spending. For instance, the user may set one or more spending thresholds based on a budget, and the alerts may apprise the user of her compliance with, or spending with respect to, the budget. In some implementations, alerts may be scheduled by the user to be triggered by user spending at levels that are less than the ultimate budget. Such implementations may provide the user with warnings and/or reminders that may enhance the ability of the user to adhere to a predetermined budget.

Alerts provided to third parties may enable the third parties to be informed of the user's spending habits. For example, a third party desiring to receive third party alerts in order to follow the user's spending may include a spouse, a parent, an administrator, a boss, a partner, a joint account holder, and/or other third parties. Third party alerts may be provided to the third party via virtually any form of communication. For instance, third party alerts may be sent as emails, text-messages (e.g., SMS messages, etc.), automated phone calls, traditional postal mail, and/or other forms of communication.

It should be appreciated that the depictions of information transmitted between entities such as wireless client device 12, processor 20, user interface 22, data storage 24, transmitter/receiver 26, point-of-sale device 14, financial institutions 16, and/or alternate client 18 in FIGS. 1 and 2 are exemplary only, and that the scope of the invention includes implementations comprising other information paths that enable system 10 to provide some or all of the described functionality with respect to wireless point-of-sale transactions in which the user is physically present at a brick-and-mortar point-of-sale device, and enables a payment to a retailer associated with the point-of-sale device by wireless client device 12.

For instance, some implementations may include interaction with a transaction server that manages communications between some or all of wireless client device 12, point-of-sale device 14, financial institutions 16, and/or alternate client device 18. In some implementations, the transaction server may be associated with one or more organizations and/or institutions that facilitate wireless point-of-sale transactions. For example, one or more of financial institutions 16 may provide and/or maintain the transaction server. As another example, the transaction server may be provided and/or maintained by a third-party that would not otherwise be involved in the transaction.

Figure 3:
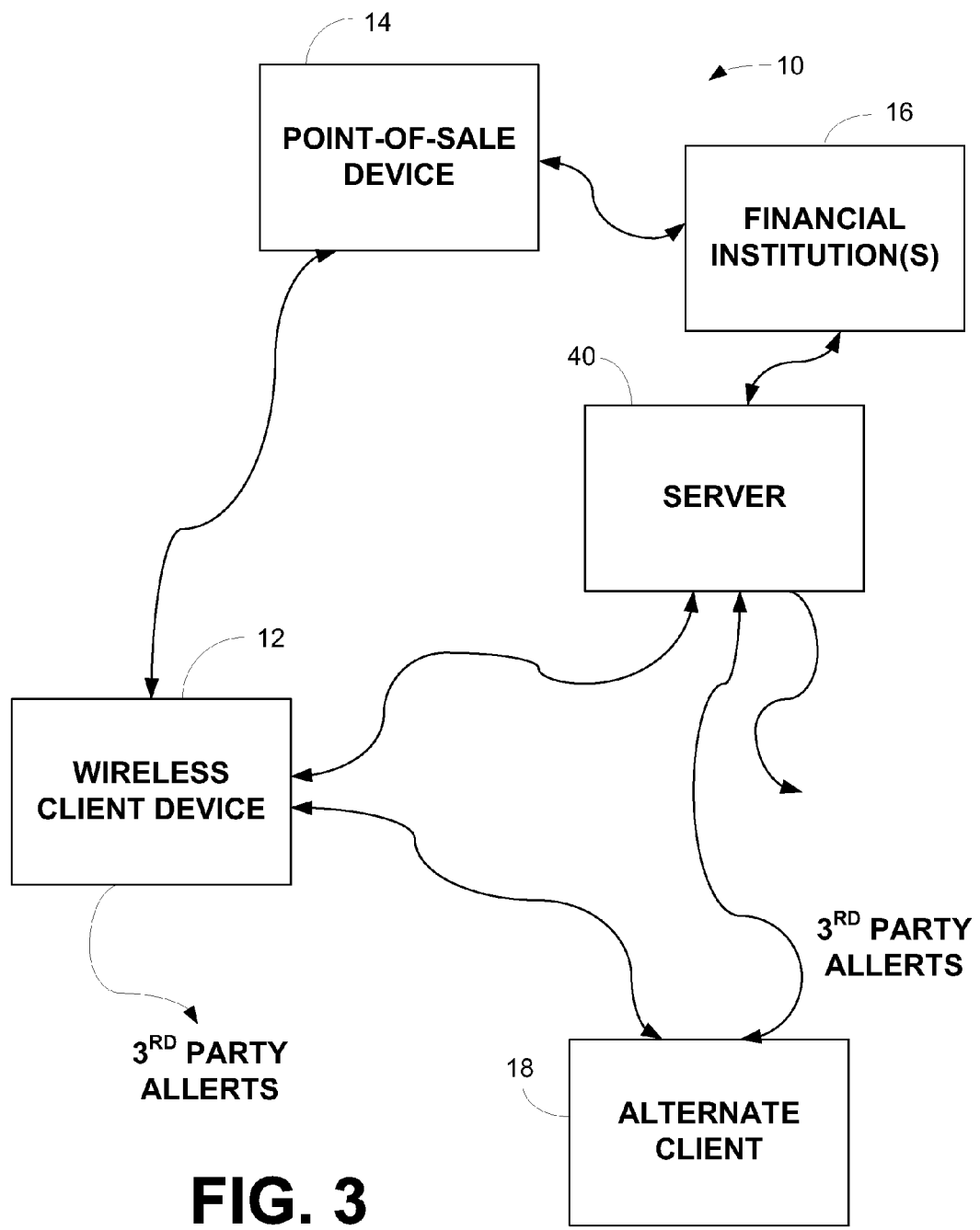
FIG. 3 illustrates a system that enables the execution and management of wireless point-of-sale transactions, according to one or more embodiments of the invention.

FIG. 3 illustrates an implementation of system 10 including a transaction server 40. As is shown, transaction server 40 may act as a "firewall" between financial institutions 16 and wireless client device 12 and alternate client 18. Although depicted as a single server, transaction server 40 may comprise a plurality of servers, some or all of which may be in communication with each other. In some instances, a single transaction server 40 (or a group of transaction servers in communication with each other) may provide a firewall for a plurality of financial institutions. In other instances, each financial institution may have its own dedicated transaction server 40.

In addition to acting as a firewall, transaction server 40 may provide some of the functionality of processor 20 described above. For example, transaction server 40 may maintain information associated with users that may be accessed remotely by wireless client device 12 and/or alternate client 18. In one such instance, account information, user spending information, spending thresholds, transaction records, user information, and/or other information associated with a user may be stored and/or managed by server 40. In some implementations, third party alerts may be transmitted to third parties from transaction server 40.

Figure 4:
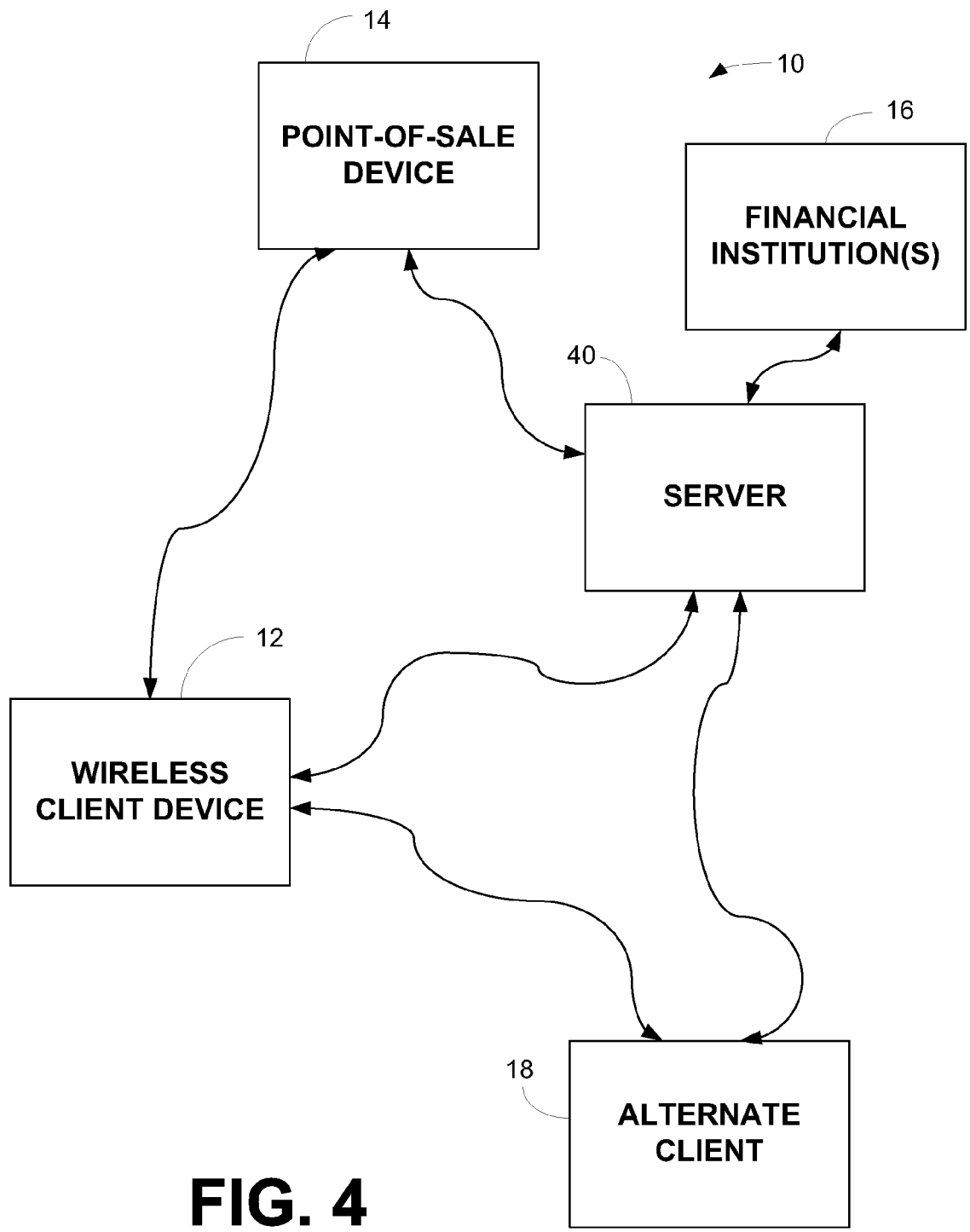
FIG. 4 illustrates a system that enables the execution and management of wireless point-of-sale transactions, according to one or more embodiments of the invention.

In one or more implementations of the invention, transaction server 40 may provide a firewall through which point-of-sale device 14 communicates with financial institutions 16, as well as wireless client device 12 and alternate client 18. One such implementation is illustrated in FIG. 4. Other implementations utilizing these and/or other information paths and/or other entities are contemplated within the scope of the invention.

Figure 5:
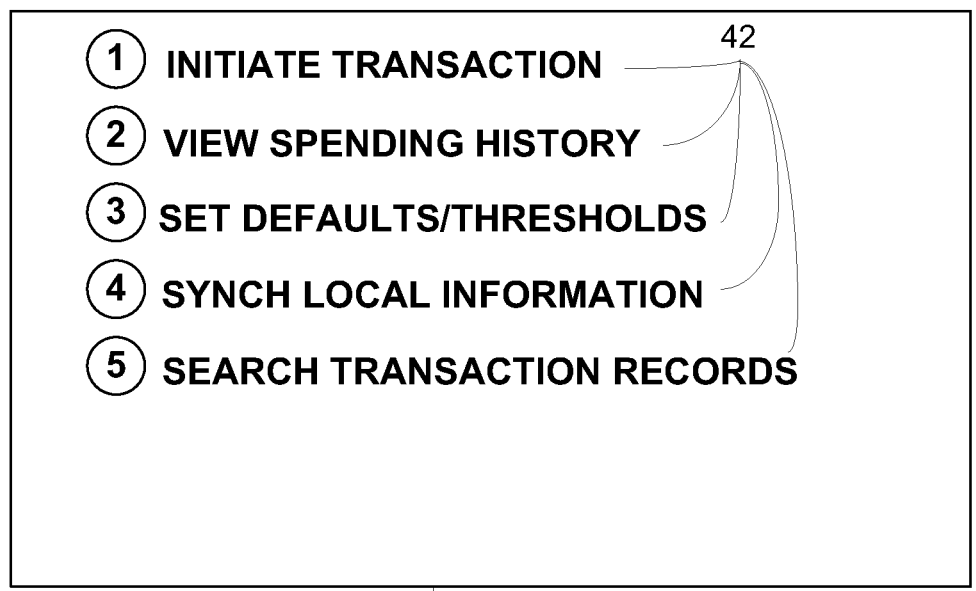
FIG. 5 illustrates a user interface, in accordance with one or more embodiments of the invention.

FIG. 5 illustrates user interface 22, according to one or more implementations of the invention. User interface 22 may convey one or more action options 42 to the user. Action options 42 may enable the user to select an action for execution by system 10. Action options 42 may comprise an initiate transaction option, a view spending history option, a set defaults option, a set thresholds option, an information synchronization option, a search transaction records option, and/or other action options.

Selection of an initiate transaction option may initiate a wireless point-of-sale transaction. Other events may also initiate a wireless point-of-sale transaction, such as receiving a transaction request from point-of-sale device 14, or other events. Once a wireless point-of-sale transaction is initiated, user interface 22 may present the user with a default payment account. As was discussed above, the default payment account may be selected based on predetermined criteria. In other instances, a default payment account may not have been established for the circumstances associated with a transaction.

Figure 6:
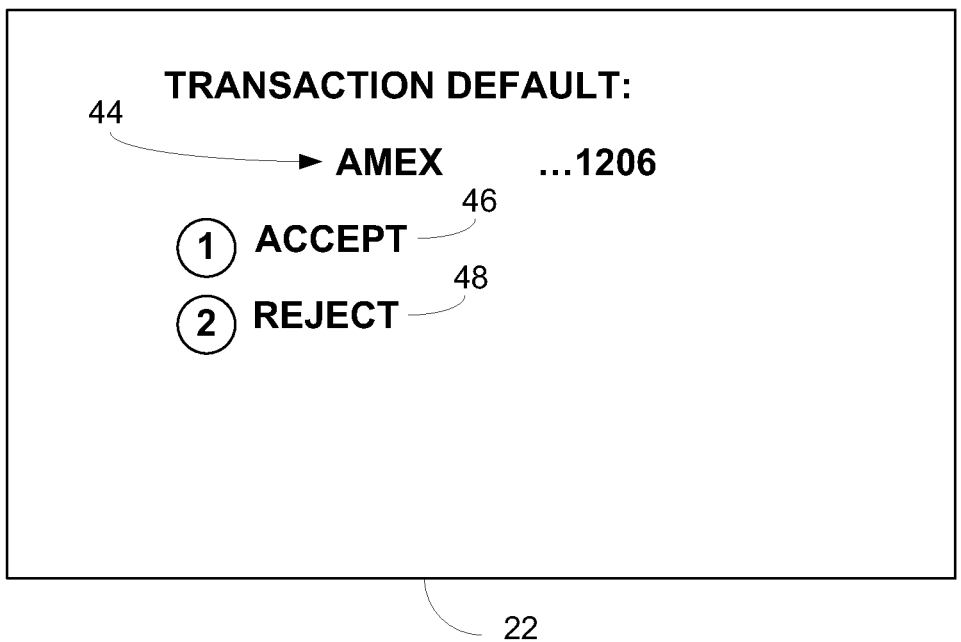
FIG. 6 illustrates a user interface, in accordance with one or more embodiments of the invention.
Figure 7:
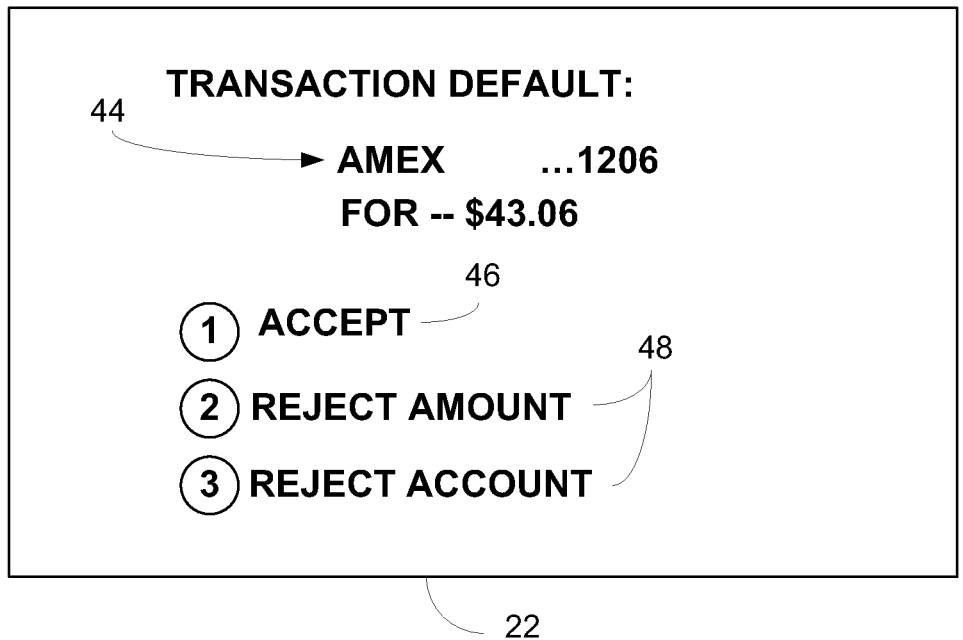
FIG. 7 illustrates a user interface, in accordance with one or more embodiments of the invention.

FIG. 6 illustrates one implementation of user interface 22 conveying a default payment account 44 to the user and enabling the user to accept or reject the default payment account via an accept option 46 or a reject option 48. Other implementations of user interface 22 enabling the user to accept or reject the default payment account are contemplated in which more or less information may be provided to the user. For example, FIG. 7 illustrates an implementation of user interface 22 that conveys the default payment account along with the amount for the transaction. In the implementation of FIG. 7, the user is enabled to reject the amount for the transaction in addition to, or instead of, the payment account.

Figure 8:
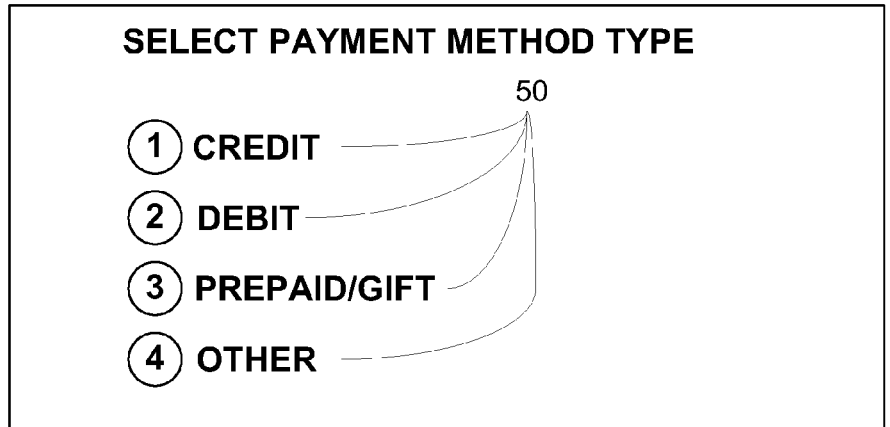
FIG. 8 illustrates a user interface, in accordance with one or more embodiments of the invention.

In the event that the user rejects the default payment account, or in the absence of a default payment account, user interface 22 may present the user with a plurality of payment methods. FIG. 8 illustrates user interface 22 providing the user with a plurality of payment method options 50. The possible payment methods may comprise different categories of payment accounts stored by account module 32. For instance, the payment methods may comprise a credit payment method, a debit payment method, a prepaid payment method, a gift payment method, and/or other payment methods. The presentation of payment method options 50 to the user may convey a ranking of the payment methods associated with payment method options 50. The payment methods may be ranked from the most likely to be selected by the user to the least likely to be selected by the user. This may be determined based on one or more predetermined criteria, such as past payment method usage gleaned from stored transaction records and/or other user settings. It should be appreciated that in some implementations, user interface 22 may skip the presentation of payment methods, and may instead simply provide a plurality of possible payment accounts. In some of these implementations, the payment accounts provided to the user may include payment accounts associated with a default payment method.

Figure 9:
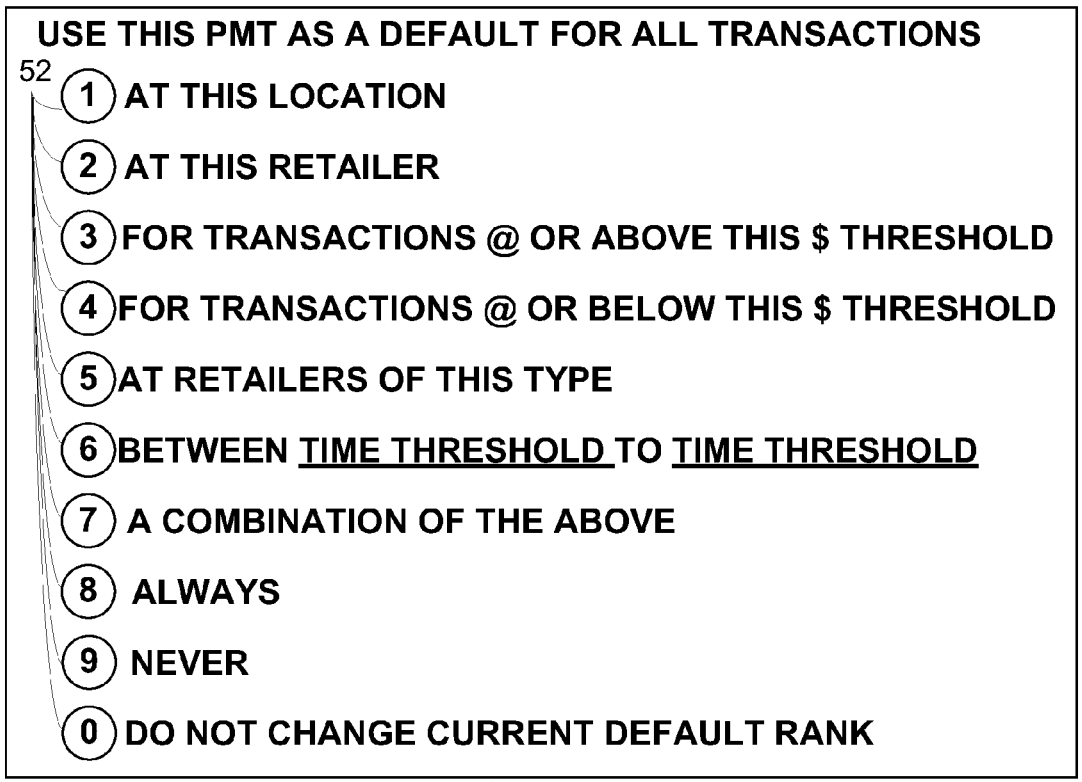
FIG. 9 illustrates a user interface, in accordance with one or more embodiments of the invention.

As is illustrated in FIG. 9, upon selection of a payment method for the transaction, user interface 22 may present a plurality of default setting options 52 that may enable the user to set the selected payment method as a default payment method for future transactions. Default setting options 52 may enable the user to set the selected payment method as the default payment method for transactions at a current location, at a current retailer, for transactions above a price threshold, for transactions below a price threshold, at retailers of a current retailer type, during a specified time period (e.g., a time period each day, a time period each week, a time period each month, a time period each year, until a specified time, etc.), a combination of considerations, for all transactions, for no future transactions, and/or based on other considerations.

As can be seen in FIG. 10, upon selection of a payment method, user interface 22 may present to the user a plurality of payment account options 56 enabling the user to select a payment account for the wireless point-of-sale transaction. The presentation of payment account options 56 to the user may convey a ranking of the payment accounts associated with payment account options 56. The payment accounts may be ranked from the most likely to be selected by the user to the least likely to be selected by the user. This may be determined based on one or more predetermined criteria, such as past payment method usage gleaned from stored transaction records and/or other user settings. It should be appreciated that payment account options 56, as shown in FIG. 10, may be presented to the user immediately (or substantially so) upon initiation of the wireless point-of-sale transaction without enabling (or requiring) the user to manually select a payment method, with the highest ranked payment account constituting the default payment account.

As is illustrated in FIG. 11, upon selection of a payment account for the transaction, user interface 22 may present a plurality of default setting options 58 that may enable the user to set the selected payment account as a default payment account for future transactions. Default setting options 58 may enable the user to set the selected payment account as the default payment account for transactions at a current location, at a current retailer, for transactions above a price threshold, for transactions below a price threshold, at retailers of a current retailer type, for transactions made when the balance of the payment account is above a balance threshold, for transactions made when the balance of the payment account is below a balance threshold, during a specified time period (e.g., a time period each day, a time period each week, a time period each month, a time period each year, until a specified time, etc.), a combination of considerations, for all transactions, for no future transactions, and/or based on other considerations.

It should be appreciated that default setting options 52 and/or 58 may be accessed and/or adjusted at a time when a wireless point-of-sale transaction is not being conducted. For example, some or all of default setting options 52 and/or 58 may be accessed and/or adjusted by selecting a default action option from a menu of action options similar to the one illustrated in FIG. 5. In some implementations, when a default payment account is frequently rejected by the user in favor of a manually selected account for a series of transactions that have certain criteria in common, processor 20 may cause a suggestion to be made to the user via user interface 22 that the manually selected account be implemented as the default payment account for the criteria shared by the series of transactions. This may enhance the efficiency associated with the use of a default payment account.

As was mentioned above with respect to FIGS. 1 and 2, once a payment account has been selected by the user for the wireless point-of-sale transaction, payment information may be wirelessly transmitted by wireless client device 12 that enables point-of-sale device 14 to secure payment (or promise of payment) for the transaction. In response to the payment (or promise of payment), point-of-sale device 14 may generate one or more transaction records that may be provided to wireless client device 12. In some instances, the transaction records may include an electronic transaction record. For instance, an electronic transaction record may be transmitted to wireless client device 12 from point-of-sale device 14, financial institutions 16, alternate client 18, transaction server 40 (FIGS. 3 and 4), or otherwise transmitted to wireless client device 12. In some of these instances, the electronic transaction record may be wirelessly transmitted to wireless client device 12 at the conclusion of the transaction, or relatively soon thereafter. The electronic transaction record may include transaction information such as a transaction amount, a transaction date, a transaction time, a transacting party (e.g., a retailer, etc.), a type (or classification) of transacting party (e.g., a type of retailer, etc.), an itemized list of goods and/or services purchased (or returned), classifications of one or more goods and/or services purchased, a location, and/or other transaction information.

In some implementations, wireless client device 12 may generate an electronic transaction record. The generated transaction record may include transaction information available to wireless client device 12 without receiving information from point-of-sale device 14 (directly or indirectly). For example, the generated transaction record may include a transaction date and/or time (e.g., as indicated by a clock and/or calendar associated with wireless client device 12), a transaction amount, a location (e.g., as indicated by a global positioning system capability, or other position indicating capability provided by wireless client device), and/or other transaction information. In some instances, user interface 22 may enable the user to input additional transaction information to add more transaction information to the electronic transaction record. For instance, the user may input a transacting party, a type of transacting party, one or more classifications of one or more goods and/or services purchased, and/or other transaction information. Some transaction information included in the electronic transaction record generated by wireless client device 12 may be inferred based on known transaction information. As a non-limiting example, a physical location of the transaction may enable an inference of a retailer associated with point-of-sale device 14.

FIG. 12 illustrates an example of a transaction record displayed on user interface 22 to the user. The user may be enabled via user interface 22 to accept or reject the transaction record for storage. Upon storage of the transaction record, account module 32, user spending module 36, and/or alert module 38 may implement the information included in the transaction record in the manner discussed above. In some instances, the transaction record may not be displayed at the end of the transaction unless requested by the user.

In one or more implementations of the invention, once the transaction record has been received and/or generated by wireless client device 12, a classification, or type, may be assigned to items purchased in the transaction, or to the transaction as a whole. FIG. 13 illustrates an implementation in which user interface 22 may convey a default classification 60 assigned to the transaction as a whole. In some instances, the default classification 60 may be included in the transaction record transmitted to wireless client device 12. In other instances in which the transaction record is generated by wireless client device 12 or in which the transaction record transmitted to wireless client device 12 does not include a default classification. The default classification may be determined based on one or more pre-determined criteria.

As can be seen in FIG. 13, the user may be enabled to accept the default classification, reject the default classification, or tag the classification for later review. In some implementations, the default classification may be displayed to the user relatively quickly after the wireless point-of-sale transaction is executed so that the user may classify the transaction (and/or items purchased in the transaction) while the transaction is fresh in the user's mind. However, if comprehensive review of the classification is not convenient for the user, the user may tag or mark the classification for later, more convenient, review. The classification of the transaction (and/or items purchased in the transaction) may be implemented by processor 20 in budgeting functions, threshold monitoring functions, and/or other functions.

FIG. 14 illustrates an implementation of user interface 22 enabling the user to select a classification option 62 for the transaction. In some instances, user interface 22 may enable the user to select classification options 62 after the user rejects the default classification. In other instances, no default classification may be determined, and user interface 22 may enable the user to select classification options 62 without providing the user with a default classification. Classification options 62 may comprise a food classification option, a clothing classification option, an entertainment classification option, a travel classification option, a work expense classification option, and/or other classification options. One or more of classification options 62 may be automatically provided by processor 20. One or more of classification options may be manually entered by the user.

As is illustrated in FIG. 15, upon selection of a classification for the transaction, user interface 22 may present a plurality of default setting options 64 that may enable the user to set the selected classification as a default classification for future transactions. Default setting options 64 may enable the user to set the selected classification as the default classification for transactions at a current location, at a current retailer, and/or based on other considerations.

FIG. 16 illustrates user interface 22 in an implementation in which the electronic transaction comprises an itemized list of goods and/or services purchased in the wireless point-of-sale transaction, and one or more of the items are individually assigned a default classification. As can be seen, user interface 22 enables the user to accept one or more of the individual default classifications, reject one or more of the default classifications, or mark one or more of the default classifications for later review.

Figure 17:
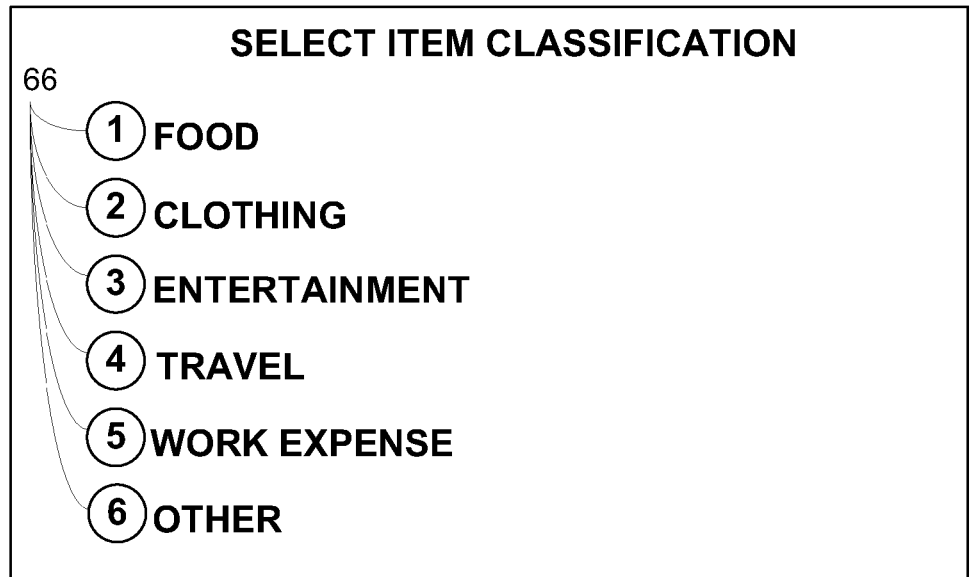
FIG. 17 illustrates a user interface, in accordance with one or more embodiments of the invention.

As shown in FIG. 17, if the user rejects one or more of the individual default classifications, user interface 22 may present one or more classification options 66 to the user so that the user may manually classify one or more of the individual items. In some implementations, individual default classifications may not be provided. In these instances the user may manually classify one or more individual items via user interface 22 (e.g., using a display similar to the one shown in FIG. 17).

Figure 18:
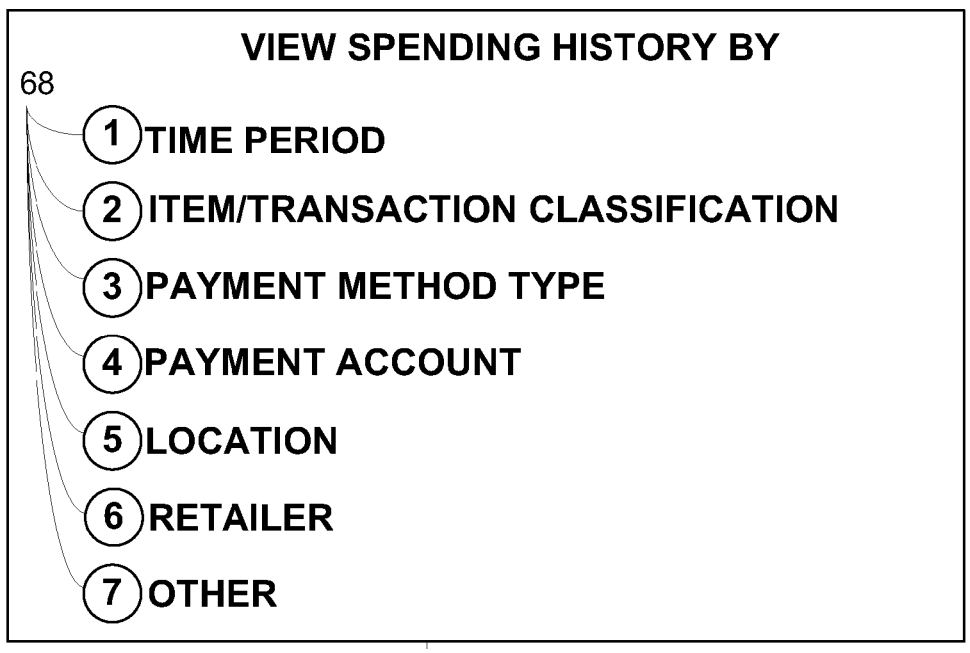
FIG. 18 illustrates a user interface, in accordance with one or more embodiments of the invention.

As was discussed previously with respect to FIG. 5, user interface 22 may enable the user to view the spending history. FIG. 18 illustrates an implementation in which user interface 22 displays a plurality of spending history viewing options 68 to the user. Viewing options 68 may enable the user to view the spending history by time period, by classification, by payment method, by payment account, by location, by retailer, or based on some other considerations. In some implementations, the spending history may automatically be provided to the user according to a default viewing option. The default viewing option may be a user selectable setting.

Based on a selection of one of viewing options 68 (or the setting of the default viewing option), user interface 22 may convey the spending history to the user. For example, FIG. 20 illustrates user interface 22 conveying the spending history to the user in accordance with a classification viewing option. This may include providing predetermined transaction information for transactions that have been classified within a selected classification or group of classifications. For instance, in the implementation shown in FIG. 20 the transaction information may comprise a transaction date, a transaction amount, a payment account, and/or other transaction information. Additionally, information related to the transactions associated with the selected classification (or classifications) as a whole may be conveyed to the user by user interface 22. For example, a total amount spent on transactions and/or items classified within the selected classification or group of classifications may be provided. The total amount may include the total amount spent on transaction and/or items within the selected classification or group of classifications in a predetermined time frame (e.g., over the previous 30-days, since the first of the month, etc.). The information related to the transaction may further include other information, such as for example, a ranking of payment accounts according to most frequently utilized, a percentage of total user spending that the spending within the selected classification(s) makes up, other relative spending comparisons between classifications, and/or other information.

User interface 22 may enable the user to select a transaction to view the transaction record associated with that transaction. For example, upon selection of one of the transactions included in FIG. 20 the transaction record associated with the selected transaction may be displayed to the user via user interface 22. FIG. 21 illustrates user interface 22 displaying a transaction record to the user. As is shown in FIG. 21, one or more transaction record options 70 may be provided to the user to enable the user to take an action with respect to the transaction record. For example, the user may modify the current classification of the transaction and/or individual classifications of one or more items included in the transaction. As another example, the user may cause the transaction record to be transmitted. This may include wireless transmission of the transaction record to point-of-sale device 14 as proof of purchase (e.g., a receipt) during an "exchange" or "return" transaction.

Referring back to FIG. 18, further examples of user interface 22 presenting the spending history to the user in accordance with other ones of viewing options 68 are not explicitly depicted. However, it should be appreciated that the presentation of the spending history in accordance with the omitted ones of viewing options 68 may follow substantially from the depiction in the drawings and the description above of the presentation of the spending history with respect to time period and classification. Further, it should be understood that the depictions of the presentations made are not limiting, and that other schemes for presenting the spending history may be implemented. For example, combinations of viewing option may be made to convey the spending history to the user. As another example, pie charts, graphs, and/or other visual means may be used to display the spending history to the user without departing from the scope of the present invention. In some implementations, the spending history may be displayed to the user in conjunction with one or more spending thresholds to enable the user to monitor current spending levels with predetermined, or budgeted, spending levels.

As was discussed above with respect to FIG. 5, user interface 22 may enable the user to select an action option associated with setting thresholds. In one implementation, setting thresholds may comprise setting spending thresholds. Spending thresholds may be associated with a predetermined future spending level, rate, and/or amount associated with a budget, and the spending thresholds may be used as a tool by the user to adhere to the budget. FIG. 22 illustrates user interface 22 providing the user with threshold basis options 72. Threshold basis options 72 may comprise setting a spending threshold on a per transaction basis, on a per time period basis (e.g., over a rolling time period, between predetermined time demarcations, etc.), and/or on other basis. Once a basis for the threshold has been established, the user may input a threshold amount. This amount may constitute the monetary amount of spending over the selected basis that will "breach" the spending threshold.

As is illustrated in FIG. 23, upon selection of a per transaction or a per time period basis, user interface 22 may enable the user to select one or more threshold options 74 which may be used to determine which transactions and/or purchased items should be applied toward the spending threshold. For example, threshold options 74 may comprise a classification option, a payment method type option, a payment account option, a location option, a retailer option, a combination of options, and/or other options. Once the user has selected the appropriate options for the threshold, transactions and/or purchased items associated with the selected ones of threshold options 74 will be applied toward the threshold.

As has been addressed above, when a spending threshold is breached an alert may be generated. FIG. 24 illustrates a plurality of alert options 76 presented to the user by user interface 22. When the spending threshold is breached, the generated alert(s) may be generated in accordance with the alert options 76 presented to the user. Alert options 76 may comprise a visual alert option, an audible alert option, a third party alert option, a restrict payment option (e.g., "freezing" one or more payment accounts, etc.), and/or other options.

Returning to FIG. 5, the selection of a search transaction records action option may enable the user to search for a particular transaction record or group of transaction records. It should be appreciated that the functionality described above with respect to the viewing of the spending history via user interface 22 enables the user to search for specific transaction records by viewing lists of transaction organized by time period, classification, payment method, payment account, location, retailer, and/or other considerations, and accessing individual transaction records for the transactions so organized. However, other searching functionality is contemplated, including text searching, searching by date, and/or other searching capabilities. The selection of the search transaction records action option may enable the user to access these additional searching functions and/or capabilities.

It should be understood to one of ordinary skill in the art that the depiction of user interface 22 in FIGS. 5-24 and the accompanying description found herein are provided for the purpose of explaining the functionality of user interface 22, and that other implementations of user interface 22 providing some or all of the functionality described above, as well as additional functionality in some instances, fall within the scope of the invention.

Figure 25:
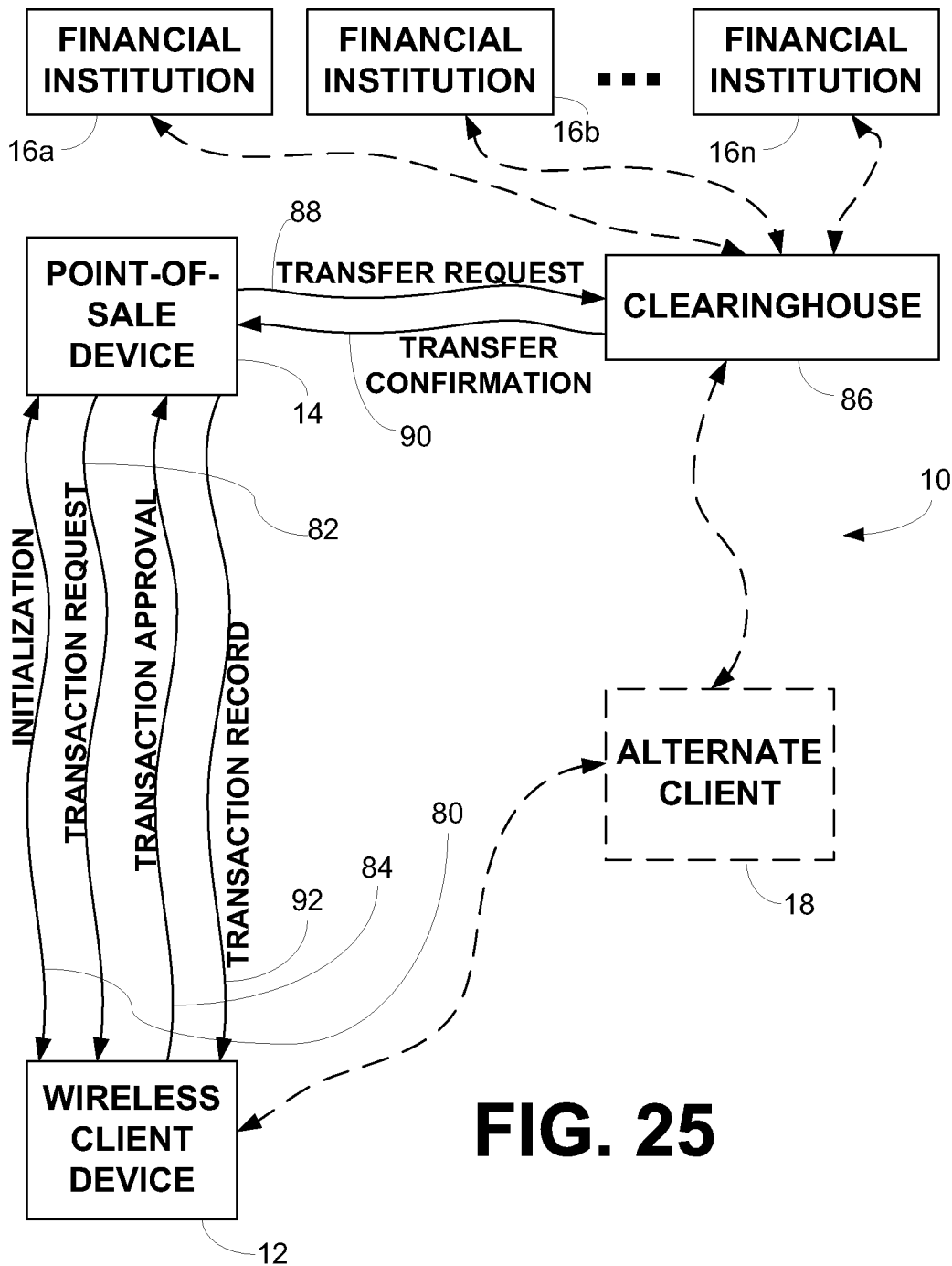
FIG. 25 illustrates a system that enables the execution and management of wireless point-of-sale transactions, according to one or more embodiments of the invention.

FIG. 25 illustrates one or more implementations of system 10, according to one or more embodiments of the invention. In one implementation illustrated by FIG. 25, system 10 enables a wireless point-of-sale transaction between a brick-and-mortar merchant and a user physically present at a facility associated with the brick-and-mortar merchant. The wireless point-of-sale transaction may begin with an initialization procedure 80. Initialization procedure 80 may include an initialization of wireless communication between point-or-sale device 14 and wireless client device 12. The wireless communication between point-of-sale device 14 and wireless client device 12 may include communication via a short range wireless media (e.g., Bluetooth, Bluetooth 2.0, Bluetooth 2.1, infrared communication, etc.).

Once communication between wireless client device 12 and point-of-sale device 14 is established by initialization 80, a transaction request 82 is transmitted from point-of-sale device 14 to wireless client device 12. The transaction request may be transmitted via the same communication link established by initialization 80. It should be appreciated that the transmission of transaction request 82 may be part (or substantially all) of initialization 80. In other instances, transaction 82 may be completely separate from initialization 80. Transaction request 82 requests approval for the wireless point-of-sale transaction from the user associated with wireless client device 12.

In some instances, transaction request 82 comprises a transaction amount that represents the cost of the transaction to the user. Transaction request 82 may further include an itemized list of goods and/or services to be purchased in the wireless point-of-sale transaction. The itemized list of goods and/or services may be used by wireless client device 12 to generate a transaction record that includes the itemized information. For instance, the itemized list of goods and/or services may be added to a transaction record received from point-of-sale device 14 (e.g., as described below), or may be used to generate a transaction "from scratch." The transaction record including the itemized list of goods and/or services may be used in the manner described above to classify (i) the goods and/or services and/or (ii) the transaction as a whole.

In some implementations, transaction request 82 may include merchant identification information that identifies the merchant. The merchant identification information may be used by wireless client device 12 to determine a default payment account in the manner provided above. Wireless client device may implement the merchant identification information in organizing a transaction record representing the transaction. For example, the merchant identification information may be used to group (and/or search) a plurality of transactions from the merchant and/or a set of related merchants (e.g., a set of merchants that offer similar goods and/or services). As another example, the merchant identification information may be used by wireless client device 12 in the manner provided above to determine a classification for the transaction and/or individual ones of the goods and/or services transacted for in the transaction by the user associated with wireless client device 12.

Wireless client device 12 receives transaction request 82 and presents the user with options for accepting the transaction. For example, as discussed above, wireless client device 12 may present the user with a default payment account to pay the transaction amount and/or other options. Upon acceptance of the transaction by the user on wireless client device 12, wireless client device 12 may transmit a transaction approval 84 to point-of-sale device 14. Transaction approval 84 may be transmitted via the communication link established by initialization 80. Transaction approval 84 may indicate the acceptance of the transaction by the user. Transaction approval 84 may include payment information, authentication information, and/or other information. The payment information may include customer clearinghouse identification information that identifies a clearinghouse account associated with the user with a clearinghouse 86.

In some instances, clearinghouse 86 may include a clearinghouse organization (or organizations) that enables the user to make payments via a plurality of payment accounts held by the user with a plurality of financial institutions. The user may enable payment via the plurality of payment accounts by "linking" each of the payment accounts to the clearinghouse account associated with the user. Linking a payment account may include providing clearinghouse 86 with information and authorization such that clearinghouse 86 may transfer funds out of and/or into the linked payment account. In one implementation, clearinghouse 86 may include Paypal®, Neteller®, and/or other electronic clearinghouse organizations. In some implementations, the payment information, in addition to the clearinghouse account identification information, may include payment account identification information that identifies a payment account linked to the clearinghouse account associated with the customer. The payment account identified by the payment account identification information may identify the payment account selected by the user on wireless client device 14 (e.g., the default payment account, etc.).

As was mentioned above, transaction approval 84 may include authentication information. The authentication information may comprise information generated by wireless client device 12 that enables clearinghouse 86 to verify that the user has accepted the transaction on wireless client device 12. For example, the authentication information may include an electronic signature (encrypted or unencrypted) generated by wireless client device 12. As another example, the authentication information may include the payment information in implementations where the payment information is encrypted by wireless client device 12 and the encryption provided by wireless client device 12 identifies wireless client device 12 to clearinghouse 86. In some implementations, the authentication information may include information determined about wireless client device 12 by point-of-sale device 14 (e.g., a caller identification of wireless client device 12, an ISP address of wireless client device 12, etc.)

As is illustrated in FIG. 25, based on the receipt of transaction approval 84 at point-of-sale device 14, point-of-sale device 14 may transmit a transfer request 88 to clearinghouse 86. Transfer request 88 may be transmitted wirelessly (e.g., a wireless Internet connection, a text message, etc.) or a wired connection (e.g., a wired Internet connection, a discrete wired connection, etc.). Transfer request 88 may request clearinghouse 86 to transfer funds from the clearinghouse account associated with the user to a clearinghouse account associated with the merchant associated with point-of-sale device 14. In some implementations, transfer request 88, may include the transaction amount, at least a portion of the payment information, the authentication information, merchant clearinghouse identification information that identifies the clearinghouse account associated with the merchant, and/or other information. For example, transfer request 88 may include an itemized list of goods and/or services that are being transacted for in the transaction. In such instances, the itemized list may be implemented by clearinghouse 86 in the manner described above with respect to server 40 of FIGS. 3 and 4 (e.g., clearinghouse 86 may generate a transaction record using the itemized list, clearinghouse 86 may transmit information including the itemized list to alternate client 18, etc.). As another example of information that may be included in transfer request 88, transfer request 88 may include merchant authentication information that enables clearinghouse 86 to verify that transfer request 88 is being transmitted from the merchant associated with point-of-sale device 14. This merchant authentication information may take a variety of forms. For instance, the merchant authentication information may include the merchant clearinghouse account identification information. In some instances, the merchant authentication information may be generated by point-of-sale device 14, such as an electronic signature generated by device 14. In some implementations, merchant authentication information may include information determined about point-of-sale device 14 by clearinghouse 86 (e.g., a caller identification of point-of-sale device 14, an ISP address of point-of-sale device 14, etc.).

In some implementations, clearinghouse 86 may store and organize received transfer requests. For instance, stored transfer requests may be used to derive information related to individual consumers, sets of consumers, individual merchants, sets of merchants, types of transactions, or other information. In these implementations, clearinghouse 86 may use this information and/or may sell the information to interested third parties.

Upon receiving transfer request 88, clearinghouse 86 may secure the transfer of funds from the payment account associated with the user that is indicated in the payment information to the clearinghouse account associated with the merchant. Securing the transfer of funds may include communicating with financial institution 16 (illustrated as financial institution 16*a*-financial institution 16*n*), and accessing the payment account in the appropriate manner to either (i) transfer funds out of the payment account or (ii) "freeze" funds within the payment account for transfer at a future time, or otherwise accessing the payment account to secure the funds. Once the payment account has been accessed, clearinghouse 86 may credit some or all of the secured funds to the clearinghouse account associated with the merchant. In some instances, crediting the secured funds to the clearinghouse account associated with the merchant may make the funds substantially instantaneously available. In other instances, the funds, though credited to the clearinghouse account associated with the merchant, may not be available immediately for withdrawal by the merchant.

As can be seen in FIG. 25, clearinghouse 86 may transmit a transfer confirmation 90 to point-of-sale device 14. Transfer confirmation 90 may be transmitted wirelessly (e.g., a wireless Internet connection, a text message, etc.) or a wired connection (e.g., a wired Internet connection, a discrete wired connection, etc.). Transfer confirmation 90 confirms that a transfer of funds from the payment account identified by the payment account identification information to the clearinghouse account associated with the merchant has been secured. In some instances, clearinghouse 86 receives a current account balance of the payment account from the appropriate financial institution 16 when clearinghouse 86 secures the funds in the payment account. In these instances, transfer confirmation 90 may include the current account balance of the payment account. In some implementations, clearinghouse 86 may also transmit some or all of the information included in transfer confirmation to alternate client 18.

Upon receiving transfer confirmation 90, point-of-sale device 14 may transmit a transaction record 92 to wireless client device 12. In some implementations, transaction record 92 may include the information described above with respect to transaction records. For instance, transaction record 92 may include the itemized list of goods and/or services transacted for in the transaction. This may enable the point-of-sale transaction to be a "paperless" transaction in which the receipt the user receives is transaction record 92. As described above, wireless client device 12, alternate client 18, and/or clearinghouse 86 may store transaction records. The stored transaction records may be produced by the user electronically (e.g., transferred, for example, from wireless client device 12, alternate client 18, or other computers) or in hard-copy (e.g., after the user prints them out) for various purposes such as for returns, exchanges, or refunds for the goods and/or services exchanged in the transaction, for reimbursement for business expenses, for tax purposes, or for other purposes.

Figure 26:
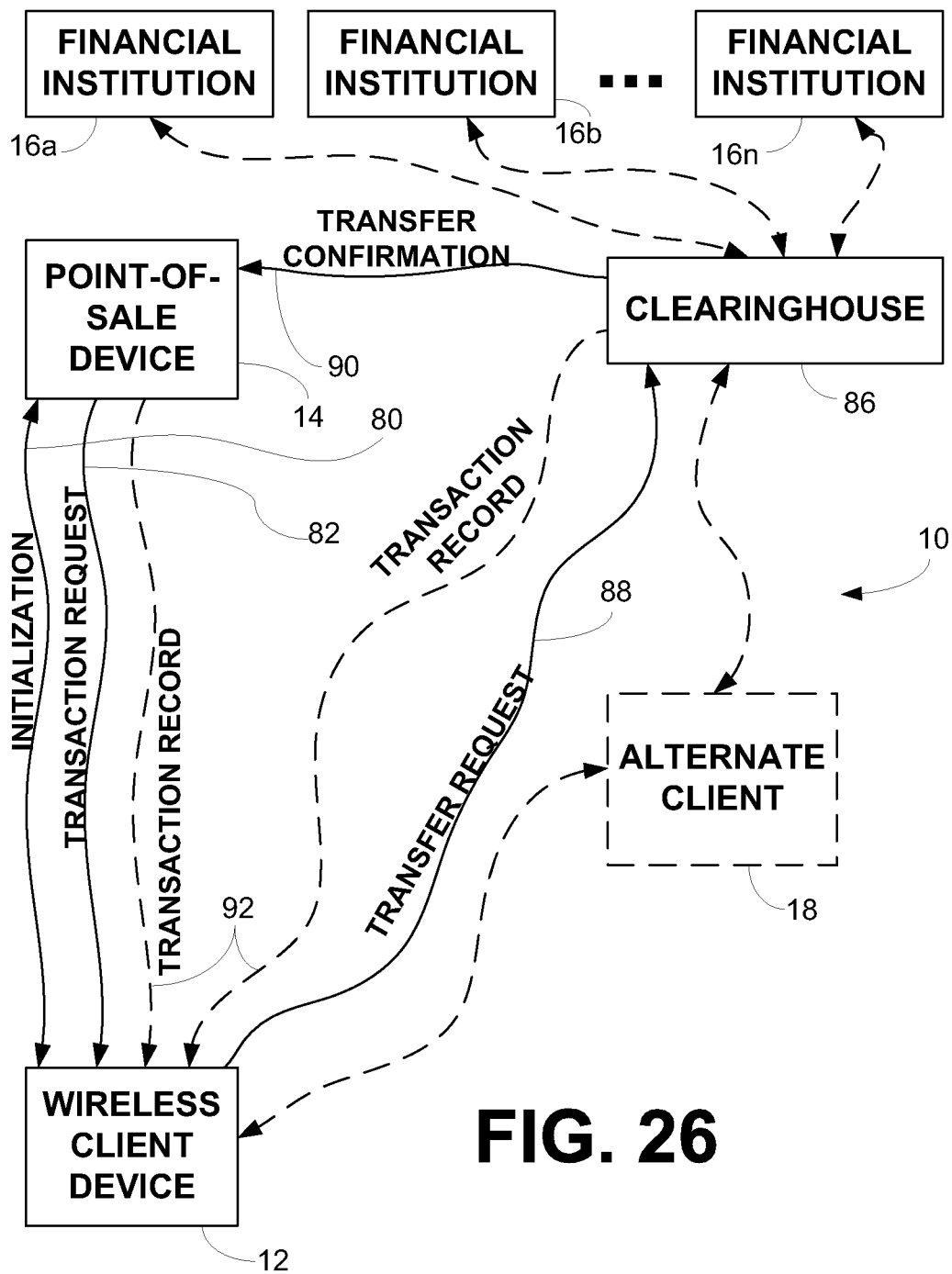
FIG. 26 illustrates a system that enables the execution and management of wireless point-of-sale transactions, according to one or more embodiments of the invention.

FIG. 26 illustrates one or more implementations of system 10, according to one or more embodiments of the invention. As can be seen in FIG. 26, the implementations illustrated by FIG. 26 differ from those illustrated by FIG. 26 in that transfer request 88 is transmitted from wireless client device 12 to clearinghouse 86. This enables the transaction to be made without transaction approval 84. Also, as can be seen in FIG. 26, transaction record 92 may be transmitted to wireless client device 12 from either of clearinghouse 86 or point-of-sale device 14. In some instances, in order to enable transfer request 88 to be transmitted to clearinghouse 86, transaction request 82 from point-of-sale device 14 to wireless client device 12 may include the clearinghouse account identification information that identifies the clearinghouse account associated with the merchant. To provide an optional level of security in the implementations of FIG. 26, transfer request 88 may include customer authentication information. The customer authentication information may correspond to the authentication information described above with respect to the transaction approval 84 of FIG. 25.

FIG. 27 illustrates one or more implementations of system 10, according to one or more embodiments of the invention. For example, FIG. 27 illustrates some of the components included in point-of-sale device 14. In the implementations illustrated, point-of-sale device 14 may include a transmitter/receiver module 94, a clearinghouse interface 96, an input interface 98, a processor 100, a data storage module 102, and/or other components.

In some instances, transmitter/receiver module 94 may enable wireless communication with wireless client device 12. For example, the wireless communication may include communication via a short range wireless media. Transmitter/receiver module 94 may enable some or all of initialization 80, transaction request 82, transaction approval 84, and/or other communication between point-of-sale device 14 and wireless client device 12.

In some implementations, clearinghouse interface 96 enable communication between point-of-sale device 14 and clearinghouse 86. For instance, clearinghouse interface 96 may include an Internet connection (e.g., a wired Internet connection, a wireless Internet connection, etc.), a radio frequency communication transmitter/receiver (e.g., to enable text messaging between point-of-sale device 14 and clearinghouse 86, etc.), and/or other communication interfaces. Clearinghouse interface 96 may enable some or all of transfer request 88, transfer confirmation 90, and/or other communication between point-of-sale device 14 and clearinghouse 86.

In some instance, input interface 98 may enable the merchant to input information regarding, for example, the wireless point-of-sale transaction. For example, input interface 98 may include one or more input devices that enable manual input of information, such as a keyboard, a keypad, a mouse, a joystick, a button, a knob, a solid-state input device, a lever, a touchpad, a touchscreen, a switch, a trackball, and/or other input devices. In some implementations, input interface 98 may enable automated input of information that identifies the goods and/or services being transacted for in the transaction. For instance, input interface 98 may include an RFID reader, an optical code scanner, a magnetic code scanner, and/or other input devices.

In some implementations, point-of-sale device 14 may include a display (not shown in FIG. 27) that displays various information throughout the course of the transaction. For example, the display may display an itemized list of goods and/or services as they are entered into point-of-sale device 14 for purchase, a status of the transaction (e.g., initialization 80 in progress, awaiting transaction approval 84, awaiting transfer confirmation 90, etc.), and/or other information. The display may include a display that is presented to the merchant and/or a display that is presented to the user during the transaction. In some implementations, transaction request 82 may be updated by point-of-sale device 14 as goods and/or services are entered into point-of-sale device 14 for purchase. This may enable wireless client device 12 to receive the updated information and provide the display that is presented to the user during the transaction.

In some instances, processor 100 may provide the processing resources to process information so as to communicate with wireless client device 12 and/or clearinghouse 86 as described above. Data storage 102 may provide electronic storage for processor 100 and may be used in conjunction with processor 100 to provide the functionality of point-of-sale device 14 described above. Data storage 102 may include data storage provided integrally with point-of-sale device 14 (e.g., RAM, hard drive storage, etc.) and/or removable electronically readable storage media (e.g., CD-rom, DVD-rom, floppy disc, solid state storage device, external hard drive storage, etc.). For example, data storage 102 may store algorithms and/or or operating instructions associated with software designed to provide the above described functionality, and processor 100 may execute the stored algorithms and/or operating instructions.

In some implementations (e.g., some of the implementations illustrated in FIG. 27), point-of-sale device 14 may include a single, integrated device that may communicate wirelessly with wireless client device 12 and clearinghouse 86. In these implementations, point-of-sale device 14 may include a power supply (e.g., a battery) that enables point-of-sale device 14 to be a "wireless" device. In other implementations, point-of-sale device 14 may include a plurality of segments in communication with each other. For example, some or all of input interface 98 may be associated with a legacy point-of-sale device (e.g., a cash register).

Throughout the description above the term user has been used interchangeably to describe both single individuals and groups of individuals acting in concert.

Thus, the invention has been fully and completely described. However, it should be appreciated that the description provided above is in no way intended to be limiting. Instead, the invention should only be limited by the scope of the claims provided hereafter.

What is claimed is:

1. A system that enables a wireless point-of-sale transaction, the system comprising:
   an input interface that enables a user to initiate a wireless point-of-sale transaction;
   a transmitter that wirelessly transmits information to a point-of-sale device in response to the initiation of the wireless point-of-sale transactions that enables the point-of-sale device to confirm payment for the wireless point-of-sale transaction;
   a receiver that receives a wireless transmission of purchase information, wherein the purchase information comprises price information for goods and/or services related to the wireless point-of-sale transaction and the goods and/or services are initially automatically assigned to one or more default classifications of goods and/or services; and
   a user spending module that enables the user to reject the one or more default classifications of the goods and/or services and assign the goods and/or services received in the wireless point-of-sale transaction to one or more classifications via the input interface, and tracks the user's spending with respect to a plurality of classifications of goods and/or services based in part on the assignment of the goods and/or services received in the wireless point-of-sale transaction to the one or more classifications.

2. The system of claim 1, wherein the user spending module enables the user to assign classifications of goods and/or services to individual ones of the goods and/or services received in the wireless point-of-sale transaction.

3. The system of claim 1, wherein the user spending module enables the user to individually assign a classification of goods and/or services to the goods and/or services received in the wireless point-of-sale transaction as a single group.

4. The system of claim 1, wherein the input interface enables the user to manually override one or more classifications of goods and/or service for the one or more of the goods and/or services received in the wireless point-of-sale transaction.

5. The system of claim 1, wherein the input interface enables the user to flag the one or more classifications rejected by the user, and enables the user to select one or more classifications for the corresponding goods and/or services at a later time.

6. The system of claim 1, wherein the user spending module enables the user to assign the goods and/or services received in the wireless point-of-sale transaction to one or more classifications via the input interface by selecting the one or more classifications from a predetermined list of classifications.

7. A method of enabling a wireless point-of-sale transaction, the method comprising:
   receiving a command to initiate a wireless point-of-sale transaction from an input interface;
   in response to receiving the command, initiating the wireless point-of-sale transaction by wirelessly transmitting information to a point-of-sale device that enables the point-of-sale device to confirm payment for the wireless point-of-sale transaction;
   receiving a wireless transmission of purchase information, wherein the purchase information comprises price information for goods and/or services related to the wireless point-of-sale transaction, wherein the goods and/or services are initially automatically assigned to one or more default classifications of goods and/or services;
   receiving, from the input interface, an assignment of the goods and/or services received in the wireless point-of-sale transaction to one or more classifications, wherein the input interface enables a user to reject the one or more default classifications of the goods and/or services; and
   tracking user spending with respect to a plurality of classifications of goods and/or services based in part on the received assignment of the goods and/or services received in the wireless point-of-sale transaction to the one or more classifications.

8. The method of claim 7, further comprising presenting information related to the tracking of user spending with respect to a plurality of classifications of goods and/or services on a display that is collocated on a single device with the input interface.

9. The method of claim 7, wherein receiving the assignment of the goods and/or services received in the wireless point-of-sale transaction to one or more classifications comprises receiving an assignment of classifications for individual ones of the received goods and/or services.

10. The method of claim 7, wherein receiving the assignment of the goods and/or services received in the wireless point-of-sale transaction to one or more classifications comprises receiving a single classification for the received goods and/or services as a single group.

11. The method of claim 7, wherein receiving the assignment of the goods and/or services received in the wireless point-of-sale transaction to one or more classifications further comprises enabling the user to manually override one or more of the one or more default classifications of goods and/or service for the one or more received goods and/or services.

12. The method of claim 7, wherein receiving the assignment of the goods and/or services received in the wireless point-of-sale transaction to one or more classifications further comprises enabling the user to flag the one or more classifications rejected by the user, and enabling the user to select one or more classifications for the corresponding goods and/or services at a later time.

13. The method of claim 7, wherein receiving the assignment of the goods and/or services received in the wireless point-of-sale transaction to one or more classifications comprises receiving a selection of one or more classifications from a predetermined list of classifications.

14. A method of enabling a wireless point-of-sale transaction, the method comprising:
   receiving a wireless transmission of a record of a point-of-sale transaction that includes price information for goods and/or services purchased related to the point-of-sale transaction, wherein the goods and/or services are initially automatically assigned to one or more default classifications of goods and/or services;
   receiving, via an input interface of a wireless client device, a classification by a user of one or more goods and/or services purchased in the point-of-sale transaction, wherein the input interface enables a user to reject the one or more default classifications of the goods and/or services;
   determining an amount of user spending on goods and/or services within the classification; and
   presenting a view to the user, via a display of the wireless client device, that conveys the amount of user spending on goods and/or services within the classification.

15. The method of claim 14, wherein determining an amount of user spending on goods and/or services within the classification comprises determining an amount of user spending on goods and/or services with the classification within a predetermined amount of time.

* * * * *